Dec. 20, 1927.
E. L. RIESKE
1,653,062
TRACTION SHEAVE
Filed March 18, 1925
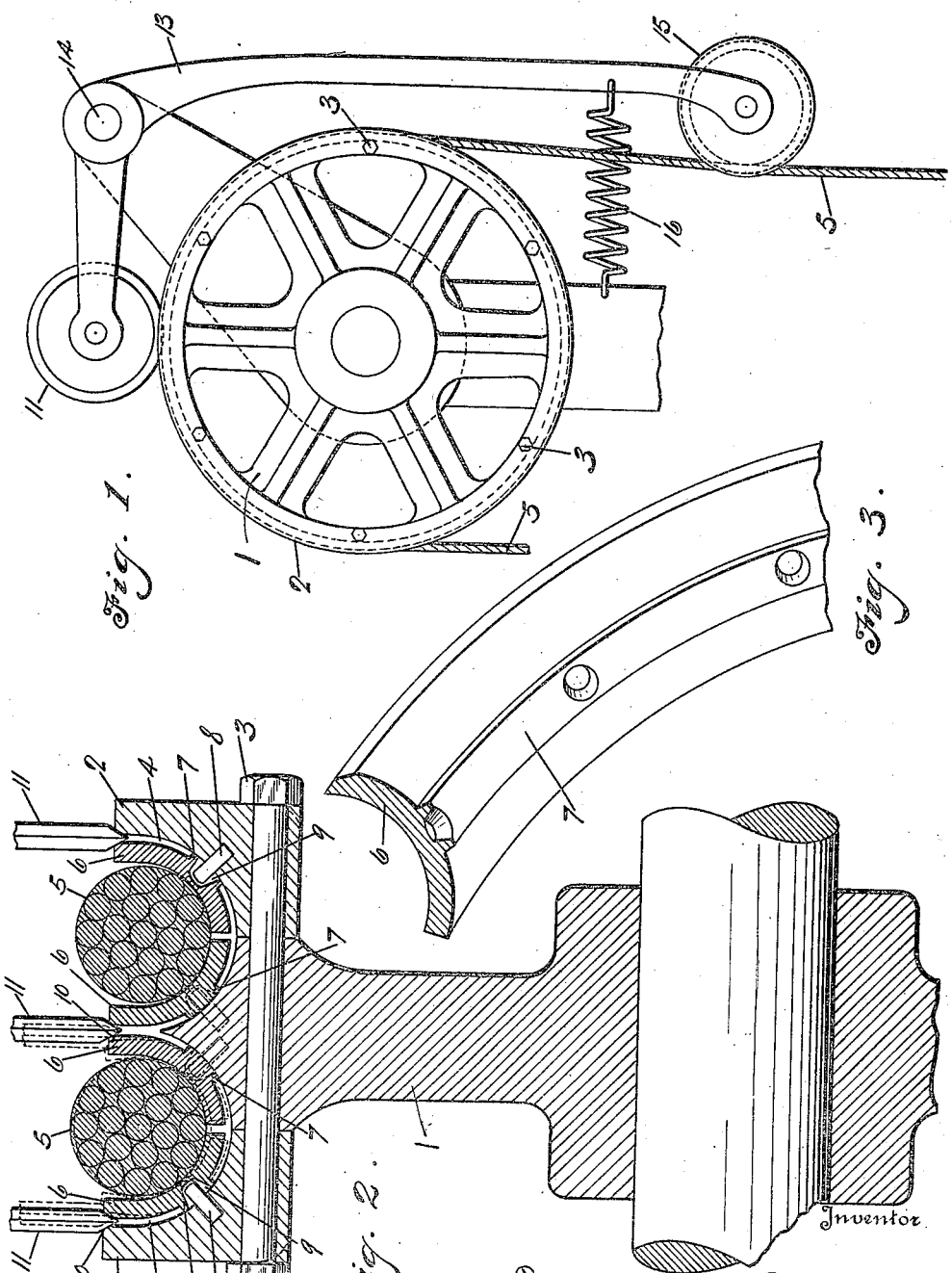

Patented Dec. 20, 1927.

1,653,062

UNITED STATES PATENT OFFICE.

EDWARD L. RIESKE, OF DAYTON, OHIO.

TRACTION SHEAVE.

Application filed March 18, 1925. Serial No. 16,481.

My invention relates to pulleys and more particularly to traction or power sheaves for hoisting apparatus, elevators and the like.

The common practice at the present time is to provide hoisting or elevator sheaves with V grooves of approximately thirty-three degrees divergence in which the hoist cable engages with a wedging effect. The entrance of the cable into such convergent groove, and its disengagement therefrom is by a lateral wiping action, which not only creates wear upon the cable, but also wears the sides of the grooves until after comparatively short periods of use such grooves wear into substantial conformity with the cross sectional contour of the cable. The cable then no longer engages tightly within such grooves, but the cable and pulley possess the tendency to slip idly one relative to the other. The present invention is designed to overcome this difficulty by providing relatively movable shoes or ring linings within enlarged grooves in the face of the pulley or sheave, which shoes or lining rings when subjected to the pull of the cable on the bottom of its seat tend to contract inwardly to clamp the cable laterally between the shoes or ring linings of the groove. This contractive movement of the shoes into gripping or clamping engagement with the cable is increased and supplemented by the wedging action of V rollers which exteriorly engage the shoes or groove linings and serve to press such shoes or linings laterally against the cable. This pressure of the shoes under the influence of the wedge rollers is controlled by the tension of the cable, thru an idler roller riding upon the cable and carried by a bell crank lever, which also carries the wedge rollers. So long as the cable is under tension, its reaction against the idler roller will press the V shaped wedge rollers into engagement with the cable gripping shoes or groove linings. However, if the elevator car overruns, or the cable is otherwise slackened, such relaxation of the cable tension permits a relaxation of the wedging pressure of the rollers upon the cable gripping shoes to simultaneously release the cable so that it may be free to come and go independent of the sheave.

The object of the invention is to simplify the construction as well as the means and mode of operation of gripper type pulleys or traction sheaves, whereby they will not only be cheapened in construction, but will be more efficient in use, positive in action, uniform in operation, automatically controlled and unlikely to get out of repair.

A further object of the invention is to provide an improved form of cable gripping device operated by the pull or tension of the cable into which the cable may enter easily and gradually with minimum friction, the gripping pressure being gradually applied until a point of maximum clamping engagement is reached at the top of the pulley or sheave, whereupon such engagement of the cable is gradually relaxed, until the cable is permitted to leave such gripping devices freely and with minimum friction or wear.

A further object of the invention is to provide a tension operated governor, by which the clamping action of the cable gripping devices will be increased as the tension or pull upon the cable increases, and which conversely will relax and release the cable when slack occurs therein, permitting the cable to pass idly over the sheave or pulley, to compensate for rebound or overrun.

A further object of the invention is to provide an improved form of replaceable interlinings for the grooves of pulleys or sheaves, so constructed and arranged as to minimize wear thereon, but capable of ready interchange and replacement if worn after long periods of use.

With the above primary and other incidental objects in view as will more fully appear in the specification, the invention consists of the features of construction, the parts and combinations thereof, and the mode of operation or their equivalents as hereinafter described and set forth in the claims.

In the accompanying drawings, wherein is shown the preferred, but obviously not necessarily the only form of embodiment of the invention, Fig. 1 is a transverse sectional view of the transverse power sheave or pulley, in which the present invention is embodied. Fig. 2 is a side elevation thereof. Fig. 3 is a sectional perspective view of one of the cable shoes or rims lining the grooves removed from the pulley.

Like parts are indicated by similar characters of reference throughout the several views.

Referring to the accompanying drawings, 1 indicates the sheave or pulley, which may be of any suitable or desirable construction or size, having lateral detachable rim sections 2—2, removably secured to the main pulley body 1, by transverse clamp bolts 3. The face of the pulley is provided with parallel grooves, each formed partially in the main body and partially in the removable rim sections 2. While for convenience of illustration, the invention has been shown in the drawings as embodied in a pulley or sheave having but two grooves, it will be understood that the construction is applicable to sheaves or drums of larger size containing multiple grooves as well as to single groove pulleys.

The grooves 4 in the face of the pulley are of somewhat greater radius than that of the cable 5. Seated within the grooves 4 are two complementary lining rings or shoes 6. These shoes or lining rings 6 are independent of each other, but approximately meet at the bottom of the groove 4, having sufficient clearance between their adjacent faces that they do not interfere one with another. The interior radius of the shoes or lining ring 6 is slightly larger than that of the cable 5, so that the cable may freely enter and leave the shoes or rings within the groove, without frictional or wiping action. The shoes or lining rings 6 are supported in slightly spaced relation with the interior face of the groove by an external bead or rib 7, which bears against the interior face of the groove 4 in the pulley serving as a spacer for the shoe or lining ring 6, and also performing the functions of a fulcrum, upon which the shoe or lining ring is capable of a transverse tilting or warping movement. The annular shoes or lining rings 6 are preferably, though not necessarily, slightly greater in diameter than the grooves in which they are to fit, so that when the rings are seated in the grooves at the top of the pulley or sheave, there will be a slight clearance diametrically at the bottom of the sheave. This clearance in any event would be quite small for example, approximately one eighth of an inch on a twenty-four inch pulley. However, this diametrical clearance is not an essential. The shoes or lining rings 6 are interengaged with the pulley by keying or interlocking in any suitable manner to prevent independent rotation or circumferential slippage upon the pulley. A simple but efficient method of interengaging the shoes or lining ring with the pulley against relative circumferential movement while permitting freedom for rocking or warping movement of the ring is afforded by providing studs or pins 8, seated in the interior face of the pulley groove and loosely engaging corresponding sockets or shallow holes 9 in the exterior faces of the shoes or lining rings 6. Normally the cable seats loosely in the bottom of the groove formed by the opposing shoe or lining ring sections 6. When, however, the cable is subjected to pulling or tension, causing it to bear more heavily upon its seat upon such shoes or ring 6, the rings will be distorted or warped into a tilting action about their bearing point upon the bead or rib 7. As the pressure or tension of the cable deflects the adjacent margins of the shoes or rings 6, at the bottom of the groove 4 inwardly toward the center of the pulley, this tilting or warping action will be transmitted to the outstanding sides of the rings or shoes 6, which will be deflected inwardly into gripping or clamping pressure laterally upon the cable 5. This clamping or gripping effect will be greater at the point opposite the direction of pull of the cable, or at the top of the pulley in the case of an elevator sheave. From this point of greatest pressure of the cable upon the shoes or rings 6, that is to say, the medial point of contact between the cable and the sheave, the gripping or clamping effect of the rings upon the cable will be progressively less in either direction. At the point where the cable first engages with the sheave and also at the point where the cable leaves the sheave there will be no clamping or gripping effect. From these points, however, toward the point of greatest pull or pressure of the cable upon the sheave, a gradual increase of gripping or clamping pressure is effected. Thus the cable enters the sheave groove, easily and freely. As it progresses around the sheave, the shoes or lining rings of the groove gradually contract transversely of the groove and cable, as the pressure upon such shoes or rings at the bottom of the groove increases, until at the medial point of greatest pressure, when the cable is firmly gripped. This gripping action is proportionate to the pull or tension of the cable. As the tension or pull upon the cable increases, the gripping or clamping action of the shoes or rings will also proportionately increase to resist any slippage of the cable, and as the tension upon the cable relaxes, the shoes or rings 6 also relax their engagement. As the cable passes the point of greatest pull or pressure, the gripping action of the shoes or rings is gradually relaxed until finally the cable is entirely free to leave the sheave or pulley without frictional resistance or wiping action and without the necessity of tearing itself from its engagement within the groove as is the case when the cable is wedged in V shaped grooves as commonly employed. This gripping or clamping action of the cable may be effected by a distortion or warping of the rings or shoes 6, constituting in effect a tilting or fulcrum movement of the engaged portion of the ring upon its spacing and supporting bead or rib 7, in which the inner margin of the ring is depressed by the pull of the cable, toward the bottom of the grooved pulley, at the same time tilting the outer margin of the ring or shoe inward against the side of the cable. This warping or distortion of the rings or shoes will be progressive circumferentially of such ring as the pulley or sheave rotates. In the event that the rings or shoes are comparatively loosely mounted in pulley grooves 4 by the provision of the clearance before mentioned, and by making the socket or holes 9 in which the studs 8 engage sufficiently large to permit limited degree of side play, such tilting or gripping action of the rings at the point of greatest pressure may be compensated for by a relative shifting of the rings within the groove 4 at a diametrically opposite point. By mounting the ring sufficiently loose within the groove 4, yet so interconnected with the pulley as to prevent relative rotation, the clamping effect of the cable may be achieved without the necessity of warping or distorting the rings.

To the contrary, by making the rings of material having sufficient degree of flexibility, the gripping or clamping action may be effected solely by the distortion or warping of the rings independent of any displacement or side play at a diametrically opposite point. It is preferred, however, to adopt an intermediate plan of operation and to employ the distortion or warping of the ring and the lateral displacement at the opposite side of the pulley, both to limited degrees in conjunction with each other.

As a further means of insuring operative clamping engagement of the shoes or rings with the cable, the outer faces of the peripheral margins of the rings or shoes 6 are inclined or beveled at 10 for engagement therewith of a series of V shaped pressure or wedge rollers 11. These rollers 11 are located contiguous to the point of greatest pull or pressure of the cable upon the sheave and consequently the point of greatest clamping or gripping engagement of the shoes or rings 6 with the cable. The wedge shaped peripheries of the pressure roller 11, engage between the beveled margins of the shoes or rings 6 and the marginal side wall of the pulley groove 4, or in the event that the grooves 4 and shoes or rings contained therein are closely located, such pressure rollers 11 might simultaneously engage two of the clamp shoes or ring 6, by projecting intermediate beveled or inclined faces 11, as indicated at 12 upon the drawing. By their inward radial pressure toward the axis of rotation of the pulley or sheave, such wedge rollers 11 exert lateral camming pressure upon the shoes or rings 6 tending to tilt or warp the standing sides or outer margins of the rings or shoes laterally against the sides of the cable 5. Obviously, the greater the depth to which such V shaped or wedge rollers 11 are thrust into engagement with the bevel margins of the shoes or rings 6, the tighter will be the gripping effect of such shoes or rings upon the interposed cable 5. Likewise, by withdrawing the wedge rollers from engagement with the shoes, the tension upon the shoes is relaxed and the cable proportionately released. To control this thrust engagement of the wedge rollers 11 with the shoes or rings 6, such rollers are mounted upon a bell crank lever 13, pivoted at 14, and carrying on the opposite arm of such lever a governor wheel or idler 15, which engages the run of the cable 5. The pivotal point 14 of the bell crank lever is preferably located inwardly toward the pulley and toward the wedge rollers 11 from the plane in which the governor roller 15 normally operates. Thus the tendency will be for the bell crank lever 13 to oscillate about its pivotal connection under influence of gravity to lift the wedge roller out of engagement with the shoes or rings whenever the cable 5 permits such inward swinging movement of the governor rollers 15. If desired, this releasing movement of the bell crank lever may be assisted by a spring 16. So long as the cable 5 is under strain or tension it tends to push the governor roller 15 outwardly, thereby oscillating the bell crank lever about its pivotal connection to press the wedge rollers 11, firmly into engagement with the several margins of the shoes or rings 6. However, in the event that the cable overruns or the load is taken off the cable, so that the tension of the cable is relaxed or slack therein accumulated, the cable no longer exerts its outward pressure upon the governor roller 15, but allows the bell crank lever to swing about the pivotal connection, either under influence of gravity, or the spring 16, thereby lifting the wedge rollers 11, and permitting the shoes or rings 6 to relax their clamping or gripping engagement upon the cable 5, whereupon the cable is free to come or go within the pulley grove. The governing action of the wedge rollers 11 is thus automatic. As the cable tension increases, the pressure of the wedge rollers 11 is automatically increased to proportionately increase the gripping action of the shoes or rings upon the cable. To the contrary, as the tension of the cable is relaxed, the engagement of the wedge rollers with the shoes or rings is proportionately relaxed. It will be seen that by this means, the traction engagement of the cable with the pulley is directly proportionate at all times to the work to be performed.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise the preferred form of several modes of putting the invention into effect and the invention is, therefore, claimed in any of its forms or modifications within the legitimate and valid scope of the appended claims.

Having thus described my invention, I claim:

1. The combination with a pulley of cable gripping means carried thereby, wedging means controlling the gripping means and means for automatically adjusting said wedging means to vary their pressure, and thereby regulate the gripping means in accordance with the tension of the cable.

2. The combination with a pulley having expansible and contractible cable grooves in the periphery thereof, and a variable cable guide engaging the cable at a point removed from the pulley and governed by the tension of a cable passing thru the groove and means for contracting such groove to grip the cable operated by the variations of the cable guide.

3. The combination with a pulley of cable gripping means carried thereby, of governing means having operative engagement with the cable at a point removed from the pulley engaging the cable gripping means for contracting the latter upon the cable, and automatically controlling the pressure thereof by the tension of the cable.

4. The combination with a pulley and transversely cable gripping devices carried thereby, of wedging means bearing upon and tending to contract the cable gripping devices with yielding pressure and means for controlling the yielding pressure of the rollers by variations of the cable tension.

5. The combination with a cable pulley, of means for regulating the operative driving engagement thereof, including a wedging means and means controlling the wedging means by fluctuations of cable tension, to insure operative driving engagement between the pulley and a cable.

6. The combination with a cable pulley of cable gripping devices carried thereby, cam members operating to effect engagement of the gripping devices with the cable and a control lever having operative engagement with the cable at a point removed from the pulley for controlling the cam members by the variations of the cable tension.

7. The combination with a cable pulley having a peripheral groove, of a circumferentially split lining for such groove interengaged therein against independent circumferential movement relative to the pulley, the sections of which are circumferentially continuous and capable of transverse rocking movement toward and from each other under influence of cable tension into and out of gripping engagement with the cable.

8. The combination with a cable pulley having a peripheral groove, of a pair of continuous flexible but non-compressible clamp rings located within the groove, said rings being deflected by the strain of the cable into gripping engagement therewith.

9. The combination with a cable pulley having a peripheral groove, a pair of rings mounted within the groove and supporting the cable thereon, said rings being spaced away from the bottom of the groove beneath the cable seat, to permit tilting movement of the rings under influence of cable pressure in which the cable seating portion of the rings is depressed within the pulley groove and the lateral portions of the rings tilted inwardly into lateral clamping engagement with the cable.

10. The combination with a cable pulley having a peripheral groove of a pair of concave non-compressible rings mounted within the groove in spaced relation with the interior walls thereof and forming a seat for the cable, said rings being capable of a warping movement under the influence of the cable pressure by which the sides of the concave rings are deflected into lateral engagement with the sides of the cable.

11. The combination with a cable pulley having a peripheral groove, and a continuous flexible but non-compressible lining for said groove capable of warping movement under the influence of the cable pressure thereon, the lining being progressively contractible and expansible in proportion to the cable pressure exerted thereon to vary its engagement with the cable.

12. The combination with a cable pulley having a peripheral groove and a continuous expansible and contractible but non-compressible lining for the groove controlled by the influence of the cable pressure thereon to vary the operative driving engagement of the cable and groove lining.

13. The combination with a cable pulley having a peripheral groove, a pair of oppositely disposed concave rings mounted within the groove, said rings having exterior bearing projections engaging the interior walls of the groove to support the rings in spaced relation therewith, said rings forming a yielding seat for a cable operatively gripped by the rings upon yielding movement thereof.

14. The combination with a cable pulley having a peripheral groove, a pair of oppositely disposed concave rings mounted within the groove, means for interengaging the rings with the pulley against relative circumferential movement, but permitting relative lateral tilting movement thereof into and out of clamping engagement with a cable seated thereon.

15. The combination with a cable pulley having a peripheral groove, a pair of oppositely disposed concave rings mounted within the groove, a series of spaced studs interconnecting the rings and pulley for unison rotation while permitting relative lateral deflecting movement thereof into and out of clamping engagement with a cable seated thereon.

16. The combination with a cable pulley, of cable gripping means carried thereby and a cable engaging therein, of a pressure means for increasing the operative driving engagement of the cable and pulley, and means for automatically varying the pressure means by the deflection of the cable under varying tension strains.

17. The combination with a cable pulley, of cable gripping means carried thereby and a cable engaging therein, of a roller for increasing the operative driving engagement of the cable and pulley, a lever upon which the roller is carried and means for oscillating the lever in accordance with fluctuations of cable tension.

18. The combination with a cable pulley, of cable gripping means carried thereby and a cable engaging therein of a roller for increasing the operative driving engagement of the cable and pulley, a lever upon which the roller is carried, and a second roller carried by the lever in spaced relation with the pulley, whereby fluctuations in the cable tension will effect the oscillation of the lever to vary the operative driving engagement of the cable and pulley.

19. The combination with a cable pulley, of cable gripping means carried thereby, a roller operatively engaging the cable gripping means to effect its engagement with the cable, and a control lever for said roller having operative engagement with the cable in spaced relation with the pulley and operating to vary the engagement of the roller in accordance with fluctuations of the cable tension.

20. The combination with a cable pulley of cable gripping means carried thereby, a wedge roller engaging with the cable gripping means and exerting camming pressure thereon to effect operative driving engagement between the gripping means and cable.

21. The combination with a cable pulley having a peripheral groove, of an expansible and contractible lining for the groove, a wedge roller engaging intermediate the lining and side of the groove as the pulley rotates serving by its camming action to contract the lining upon a cable within such lined groove.

22. The combination with a cable pulley having a peripheral groove, of a movable cable clamp ring mounted therein, and a roller operating against said clamp ring to move said ring into clamping engagement with the cable.

23. The combination with a cable pulley having a peripheral groove, of a movable cable clamp ring mounted therein, means operating against said clamp ring to move said ring into clamping engagement with the cable, and means for regulating the clamping engagement of said ring in accordance with the tension of the cable.

24. The combination with a cable pulley of cable gripping means carried thereby, and operating means therefor having engagement with the cable at a point removed from the pulley and governed by variation of the cable tension for adjusting the cable gripping means.

25. The combination with a traction sheave for a cable, of an adjustably mounted idler pulley engaging the cable at a point removed from the sheave and automatically adjustable in accordance with variations of cable tension, and means governed by the adjustment of said idler pulley for varying the traction engagement of the sheave and cable.

26. The combination with a traction sheave for a cable of a cable guide tending to deflect the cable out of a straight line against the tension of said cable, and means governed by the deflection of the cable from a straight line for varying the traction engagement of the sheave.

27. The combination with a cable pulley of cable gripping means carried thereby, a cable guide tending to deflect the cable out of a straight course against the pulling tension of the cable and an operative connection between the cable guide and the cable gripping means by which the degree of gripping engagement is governed by fluctuations of the cable tension.

28. The combination with a traction sheave for a cable, of an adjustable cable guide tending to deflect the run of the cable out of a straight line and variable under influence of fluctuations of cable tension, and means for varying the traction engagement of the sheave and cable by the adjustment of said cable guide.

In testimony whereof, I have hereunto set my hand this 9th day of March A. D. 1925.

EDWARD L. RIESKE.